United States Patent Office 3,518,057
Patented June 30, 1970

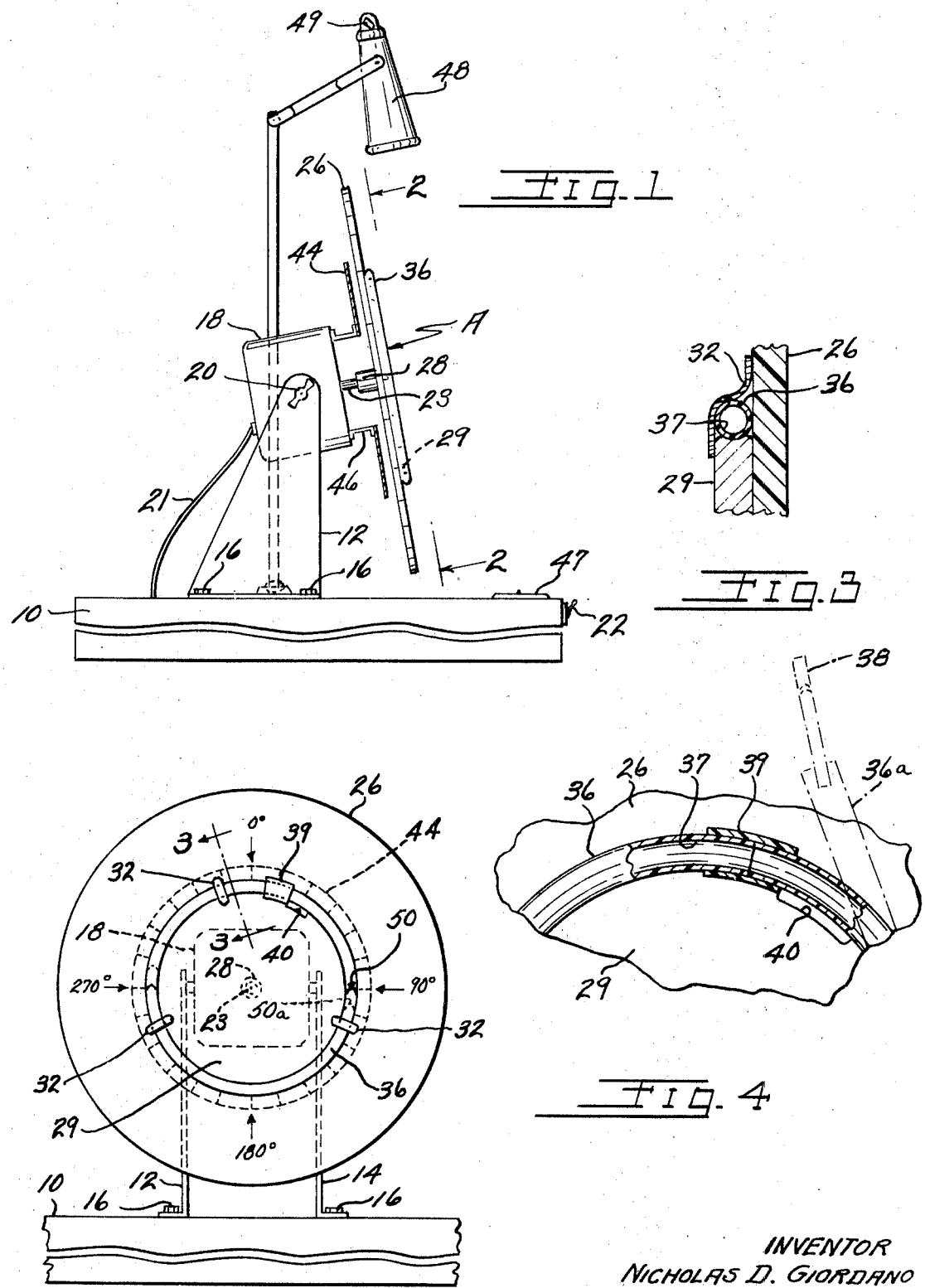

3,518,057
METHOD AND APPARATUS FOR THROMBUS FORMATION TIME DETERMINATIONS
Nicholas D. Giordano, Cleveland Heights, Ohio, assignor to Huron Road Hospital, Cleveland, Ohio, a corporation of Ohio
Filed Apr. 22, 1966, Ser. No. 544,474
Int. Cl. G01n *33/16, 11/04*
U.S. Cl. 23—230                              8 Claims

ABSTRACT OF THE DISCLOSURE

Methods and apparatus for determination of thrombus formation time in a blood sample wherein in-vivo conditions are simulated by causing the sample to flow within a tubular hoop which is mounted on a turntable the plane of said turntable being positioned at an angle of approximately 75–82 degrees to the horizontal.

---

This invention relates to thrombotic and antithrombotic function of the coagulation mechanism and more particularly to the thrombus formation time determinations of native blood or plasma wherein a physician may quickly and easily evaluate the function or state of the coagulation system of patients suspected of thrombotic tendencies or patients on antithrombotic or anticoagulant therapy.

Prior methods and devices for evaluating the coagulation mechanism are costly, time consuming and difficult in operation. Additionally, such prior devices and techniques fail to mimic the in-vivo conditions because the blood or plasma is not subjected to basically the same hydrodynamic conditions which occur when such blood flows through blood vessels.

Therefore, it is an object of the present invention to provide a method and device to determine thrombus formation time of blood, substantially under the same conditions it is subjected to when in a blood vessel.

A further object of the invention is to provide a technique and device of the above type wherein a thrombus is the final end point and not a clot which is an in-vitro occurrence.

A further object of the invention is to provide a method and device of the above type wherein the blood or plasma being tested is subjected to basically the same hydrodynamic conditions which occur when such blood flows through blood vessels.

A further object of the invention is to provide a thrombus formation time determination device that is simple in construction, inexpensive to manufacture, easy to transport, simple to operate, and highly effective and accurate in operation.

Briefly, the foregoing objects are accomplished by the provision of thrombus formation time determination device, including a transparent tubular hoop having a closed annular bore approximately half filled to a predetermined level with a coagulable fluid and a clotting reactant. Mounting means are provided to position the hoop with its equatorial plane in an upright position (preferably at a 78° angle from the horizontal). Suitable rotating means, such as an electric motor, is provided for rotating the hoop in such equatorial plane and about the longitudinal axis of the hoop to cause the blood and reactant to flow in said bore unidirectionally thus mimicking the in-vivo conditions of motion and at a speed which will produce a thrombus, similar pathophysiologically to those observed in-vivo, and not a clot. Thus, coagulation processes may be observed through the transparent hoop under conditions simulating blood flow in a human blood vessel. A stationary 360° circular scale or protractor, for example, may be positioned behind the rotating hoop, parallel thereto, with the zero-degree reading at the top, to provide indicating points for noting changes in fluid level in the hoop as clotting formations occur in the fluid.

In practice, the hoop is preferably half-filled with a coagulable fluid and a clotting reactant so that the fluid level on the right side of the hoop, for example, is at the 90°, point on the scale. The hoop is then rotated clockwise (at approximately 12 r.p.m., for example) and a stopwatch is started. With the hoop thus rotating, such fluid level remains at the 90° mark until coagulation of some type commences. When a thrombus formation occurs, (usually in ten to fifteen minutes), such fluid level will move or drift down a few degrees (usually about 4° to 7°) beyond the 90° mark and the time of such movement is noted on the stopwatch. Rotation of the hoop may be continued to secure the time for a subsequent fibrin formation.

Thus, there is provided a thrombus time determination device that determines clotting time under almost identical conditions as occurring in a human blood vessel. Such device is most simple to use and highly accurate in operation.

Other objects and advantages of the invention will be apparent from the following description taken in conjuction with hte drawings, wherein:

FIG. 1 is a side elevational view of a thrombus time determining device, partly in section, constructed in accordance with the invention;

FIG. 2 is a front elevational view taken along the line 2—2 of FIG. 1;

FIG. 3 is a view taken along the line 3—3 of FIG. 2; and

FIG. 4 is a broken enlarged view, partly in section, showing details of the hoop joint shown in FIG. 2, and showing in dot-dash lines a portion of such joint when opened.

Although the invention has been shown and described herein with reference to the determination of the thrombus formation of blood, it will be understood that it may be used to find the time of coagulation for any coagulable fluid.

Referring to the drawings, there is shown a thrombus time determining apparatus in the form of a clotting wheel, generally designated as A, mounted on a suitable mounting means in the form of a box or base 10 that supports a pair of spaced parallel uprights or supports 12 and 14, which are secured to the base by the bolts 16. A suitable rotating or drive means, such as an electric motor 18, is adjustably supported, for limited rotational movement in a vertical plane, between the spaced upper ends of the uprights 12 and 14 by the wing nut 20. The motor 18 contains the usual lead-in wires 21 connected to a suitable source of electrical power and controlled by the switch 22, and includes a rotatable shaft 23 having secured to its outer end a transparent wheel or circular disk 26, such disk being fastened to the shaft 23 via the disk securing hub 28. Positioned centrally on the outer side of the disk 26 is a second transparent circular disk 29 of lesser diameter than the disk 26 and which functions as a fixture or holder for receiving the hoop 36 as will be hereinafter described.

Detachably secured to the disk by means of removable tape 32 is a flexible tubular substantially transparent hoop 36 having an annular closed bore 37. In practice, the hoop 36 is first partially filled with a coagulable fluid and a clotting reactant through one end 36a of the hoop with a pipette 38, for example, as shown in dot-dash lines in FIG. 4, after which the two free ends of the hoop are placed together in coacting end-to-end relation, as shown in FIG. 4, and detachably retained in such position by the transparent sleeve 39, which has an inside diameter equal to the outside diameter of the hoop 36. The hoop 36 is then placed about the periphery of the disk 29 in preparation for the test run. The disk 29 contains a cutaway portion 40 to enable easy removal of the hoop 36 from the disk 29 after the test is terminated. The hoop 36 and the sleeve 39 may be formed of any suitable partially resilient transparent material such as a transparent synthetic organic plastic. A polyvinyl chloride tubing has been found to be satisfactory.

A suitable stationary, coacting, protractor 44 may be disposed directly behind and spaced from the hoop 36 in substantially parallel relation thereto to provide indicating points for determining changes in position of the level of the fluid in the hoop as thrombus and fibrin formations occur therein as such hoop is rotated, as will be hereinafter described. The protractor 44 is secured to the bracket 46 which, in turn, is secured to the motor housing 18. The protractor may be any suitable circular scale such as, for example, a 360° circular scale with the zero-degree reading disposed at the top as shown in FIG. 2.

A lamp 48 controlled by a conventional switch 49 may be positioned on the base 10 to illuminate the hoop 36 and the scale 44 therebehind. A stopwatch 47 may be provided on the base 10.

In a preferred form of operation, the tubing or hoop 36 is opened and a 1.0 milliliter of whole blood or blood plasma and, 0.1 milliliter of control or test solution is inserted into one end 36a of the hoop by means of the pipette 38. The hoop is then closed by the sleeve 39 and placed on the disk 29 on the wheel 26 and the motor started to allow proper mixing for at least one minute. After such mixing, the motor is stopped, and the hoop re-opened, and 0.1 milliliter of calcium chloride is added. The hoop is then re-sealed (by the sleeve 39) and placed back on the disk 26, by again stretch-fitting it over the disk 29 thereon.

Preferably, the hoop is approximately half filled with fluid (substrate) and reactant so that the fluid level 50 initially is disposed at approximately the 90° mark on the scale 44 as shown at FIG. 2. The electric motor 18 is again started to rotate the hoop 36 in a clockwise direction (as indicated by the arrow in FIG. 2), with the speed of rotation of the hoop causing the fluid therein to flow through the bore 37 in a manner simulating hydrodynamic flow of blood in a blood vessel. This may be accomplished, for example, with the hoop 36 being approximately 12.5 inches in length (with a diameter of approximately 4 inches) and with the rotational speed of the hoop being approximately 12 revolutions per minute. Other sizes of hoop in coaction with related speeds of rotation may be used, of course, so long as a fluid flow through the hoop bore simulates hydrodynamic flow of blood in a blood vessel. When rotation of the hoop 36 is commenced, the fluid level 50 will be initially at the 90° mark, at which time the stopwatch 47 is started. In about 10 to 15 minutes a thrombus formation will occur at the fluid level 50 at which time such fluid level will commence to drop down a few degrees (usually about 5 to 7 degrees) from such 90° mark to the level 50a and the time of such drop in level is noted on the stopwatch, such time being the clotting time (i.e. thrombus formation time) of the fluid being tested. Rotation of the hoop may be continued to record, in a similar manner, other clotting formations such as a subsequent fibrin formation, which will cause the fluid level to drop a few degrees further down the scale from the position it was in for the thrombus formation.

The disk 26 must be disposed in at least a partially upright position. Better results are secured when the equatorial plane of the hoop is disposed at a 75° to 82° angle to the horizontal, with an angle of 78° being preferred, such motor rotating the hoop in such equatorial plane thereof and about the longitudinal axis of the hoop.

It will be understood that the test may be run, in like manner, by rotating the wheel counterclockwise and noting the fluid level drop from the 270° mark.

The invention also contemplates the method of determining clotting time of a coagulable fluid including the steps of providing a substantially transparent tube having an elongated internal bore, then inserting a predetermined volume of coagulable fluid and a clotting reactant in the bore of the tube and moving said fluid and reactant through the bore to simulate hydrodynamic blood flow through a blood vessel, and then observing through said transparent tube the time lapse between the time of insertion and the time of clotting of the fluid. Refinements of the above method include using the tube in the form of a closed circular hoop and positioning the hoop so that its equatorial plane is disposed in at least a partially upright position (preferably at a 78° angle to the horizontal), then rotating said hoop in said equatorial plane and about the longitudinal axis of the hoop whereby the fluid and reactant flow in said bore at a speed simulating hydrodynamic blood flow in a blood vessel.

Thus, there is provided a clotting wheel that can be of great use because of its simple construction and operation. Any technician, after a limited period of instruction can utilize the clotting wheel as a test instrument to study:

(1) Thrombus formation time of whole blood or plasma.

(2) As a screening test for patents with thrombotic tendencies and hypercoagulable states.

(3) To differentiate clotting problems due to plasma, serum or platelet factor deficiency, qualitative or quantitative.

It can be an important tool for research investigators of blood coagulation in the study of:

(1) Thrombus formation.

(2) Platelet adhesiveness.

(3) Factors influencing or inhibiting platelet aggregation.

(4) It can be used to study rate of fibrin formation and the time lapse between platelet aggregation (VM) and fibrin formation.

(5) It can be utilized to study the effects of antithrombotic and thrombotic agents (accelerators and inhibitors of blood coagulation).

With the present invention, clotting processes are completely visible. With the addition of a photocell, the instrument may be made completely automatic. With the addition of a dissecting microscope or similar instrument, one can follow the various steps of blood coagulation in-vitro more closely. Also, one can produce thrombi and compare them microscopically to in-vivo thrombi.

It will be understood that the rotation speed (12 r.p.m.) and the dimensions of the tube 36 are relative. In other words, any suitable combination of rotational speed in coaction with corresponding size of the hoop may be effected so long as hydrodynamic flow of blood in a blood vessel is simulated. Likewise, the inside diameter of the bore 37 of the hoop (⅛ inch) need not be exactly the same as that of a blood vessel, so long as simulation of hydrodynamic flow is effected by the invention.

The terms and expressions which have been employed are used as terms of description, and not of limitation, and there is no intention, in the use of such terms and expressions, of excluding any equivalents of the features shown or described, or portions thereof, but it is recognized that various modifications are possible within the scope of the invention claimed.

I claim:

1. A thrombus formation time determining apparatus comprising, a tubular substantially transparent hoop having an annular closed bore partially filled with a predetermined volume of coagulable fluid and a clotting reactant, mounting means for positioning said hoop with its equatorial plane in at least a partially upright position, and means for rotating said hoop in said plane and about the longitudinal axis of the hoop to cause the fluid and reactant to flow in said bore to simulate hydrodynamic blood flow through a blood vesel, whereby clotting time of said fluid may be observed through said transparent hoop under conditions simulating hydrodynamic blood flow in a human blood vessel, said hoop being disposed with its equatorial plane at an angle of approximately 75° to 82° to the horizontal.

2. The structure of claim 1 wherein said angle is approximately 78°.

3. The structure of claim 1 wherein said fluid is blood plasma.

4. The structure of claim 1 wherein said fluid is whole blood.

5. The structure of claim 1 wherein said reactant is calcium chloride.

6. The structure of claim 1 wherein said bore is approximately half filled with said fluid and reactant to a predetermined fluid level, and a stationary coacting protractor is disposed directly behind and spaced from said hoop in substantially parallel relation thereto to provide indicating points for determining changes in position of said fluid level as thrombus and fibrin formations occur in the fluid as said hoop is rotating.

7. The structure of claim 6 wherein said hoop is a transparent synthetic organic plastic tube formed into a circular hoop configuration with its ends detachably joined by a second transparent tube having an inside diameter substantially equal to the outside diameter of said first-named tube to provide for insertion of the fluid and reactant into said base, said protractor being a 360° circular scale with the zero degree reading disposed at the top thereof, and said hoop is rotated clockwise in a direction facing said scale whereby the fluid level before thrombus formation is disposed at approximately the 90° mark on said protractor, and after thrombus formation said level is disposed at a point on said protractor at least a few degrees beyond the 90° mark.

8. A method of determining clotting time of a coagulable fluid comprising, providing a substantially transparent closed circular hoop having an annular closed internal bore, inserting a predetermined volume of coagulable fluid and a clotting reactant in said bore, positioning said hoop so that its equatorial plane is disposed at an angle of 75° to 82° to the horizontal, rotating said hoop in said plane and about the longitudinal axis of the hoop whereby the fluid and reactant flow in said bore at a speed simulating hydrodynamic flow of blood in a blood vessel, and observing through said transparent tube the time elapsed between the time of initial rotation of the hoop and the time of clotting of the fluid.

References Cited

UNITED STATES PATENTS

| 3,041,146 | 6/1962 | Kuzeu. | |
|---|---|---|---|
| 3,158,445 | 11/1964 | Huff. | |
| 3,267,364 | 8/1966 | Page et al. | 23—253 X |
| 2,878,715 | 3/1959 | Rhees. | |

OTHER REFERENCES

Chandler, A. B., Journal of the International Academy of Pathology, vol. 7, pp. 110–114 (1958).

Poole, J. S. F., Quarterly Journal of Experimental Physiology and Cognate Medical Sciences, vol. 44, pp. 377–384 (1959).

JOSEPH SCOVRONEK, Primary Examiner

E. A. KATZ, Assistant Examiner

U.S. Cl. X.R.

23—253; 73—64.1